(12) United States Patent
Daines et al.

(10) Patent No.: US 8,343,359 B2
(45) Date of Patent: Jan. 1, 2013

(54) INSTALLATION AND METHOD FOR THE PURIFICATION OF AN AQUEOUS EFFLUENT BY MEANS OF OXIDATION AND MEMBRANE FILTRATION

(75) Inventors: Catherine Daines, Marly le Roi (FR); Jean-Christophe Schrotter, Maisons-Lafitte (FR); Herve Paillard, La Villedieu du Clain (FR)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 895 days.

(21) Appl. No.: 10/577,753

(22) PCT Filed: Oct. 15, 2004

(86) PCT No.: PCT/FR2004/002653
§ 371 (c)(1),
(2), (4) Date: Jul. 20, 2006

(87) PCT Pub. No.: WO2005/047191
PCT Pub. Date: May 26, 2005

(65) Prior Publication Data
US 2007/0023363 A1  Feb. 1, 2007

(30) Foreign Application Priority Data
Oct. 30, 2003 (FR) ..................................... 03 12765

(51) Int. Cl.
*C02F 1/72* (2006.01)
*C02F 1/78* (2006.01)
*B01D 63/00* (2006.01)

(52) U.S. Cl. ........ 210/759; 210/760; 210/763; 210/205; 210/220; 210/321.6; 422/147

(58) Field of Classification Search .................. 210/760, 210/763, 758, 198.1, 192, 767, 807, 205, 210/220, 194, 321.6, 291, 759, 765, 805, 210/651, 661; 422/139, 147
See application file for complete search history.

(56) References Cited

U.S. PATENT DOCUMENTS
4,076,617 A * 2/1978 Bybel et al. .................. 210/748
(Continued)

FOREIGN PATENT DOCUMENTS
JP   2000 197895   7/2000

OTHER PUBLICATIONS
Kim, Jong-Oh; Shin, Eung-Bai; Wookeun, Bae; Kim, Seog-Ku; and Kim, Ree-Ho; "Effect of intermittent back ozonation for membrane fouling reduction in microfiltration using a metal membrane," Elsevier Science B.V., 2002, pp. 269-278.

(Continued)

*Primary Examiner* — Lucas Stelling
(74) *Attorney, Agent, or Firm* — Coats & Bennett, P.L.L.C.

(57) ABSTRACT

A system and method for treating an aqueous effluent having organic material. The system comprises a single cell reactor having an injector for injecting an oxidizing gas into the reactor. Disposed downstream from the injector is an immersed membrane filtration device for filtering the effluent contained or passing through the reactor. Disposed between the membrane filtration device and the injector for directing an oxidizing gas into the reactor, is a bed of catalyst material. Preferably the oxidizing gas injector injects an oxidizing gas in a direction co-currently the direction of the effluent being treated. The bed of catalyst material is capable of catalyzing the oxidation of the organic material in the effluent or absorbing the organic material.

32 Claims, 1 Drawing Sheet

U.S. PATENT DOCUMENTS

| | | | | |
|---|---|---|---|---|
| 4,081,365 | A | * | 3/1978 | White et al. .................. 210/626 |
| 4,137,162 | A | * | 1/1979 | Mohri et al. .................. 210/661 |
| 4,589,927 | A | * | 5/1986 | Allen et al. .................. 422/147 |
| 4,795,735 | A | * | 1/1989 | Liu et al. ...................... 210/694 |
| 4,923,843 | A | * | 5/1990 | Saforo et al. .................. 210/694 |
| 5,372,723 | A | * | 12/1994 | de Geus et al. ............... 210/639 |
| 5,407,644 | A | * | 4/1995 | Rytter et al. .................. 422/147 |
| 5,607,593 | A | | 3/1997 | Cote et al. |
| 5,932,099 | A | | 8/1999 | Cote et al. |
| 2001/0022290 | A1 | * | 9/2001 | Shiota et al. .................. 210/749 |
| 2003/0127389 | A1 | | 7/2003 | Cote et al. |
| 2003/0178365 | A1 | | 9/2003 | Beck et al. |

OTHER PUBLICATIONS

Takizawa, Satoshi; Fujita, Kenji; and Soo, Kim Hyung; "Membrane fouling decrease by microfiltration with ozone scrubbing," Elsevier Science B.V., 1996, pp. 423-426.

* cited by examiner

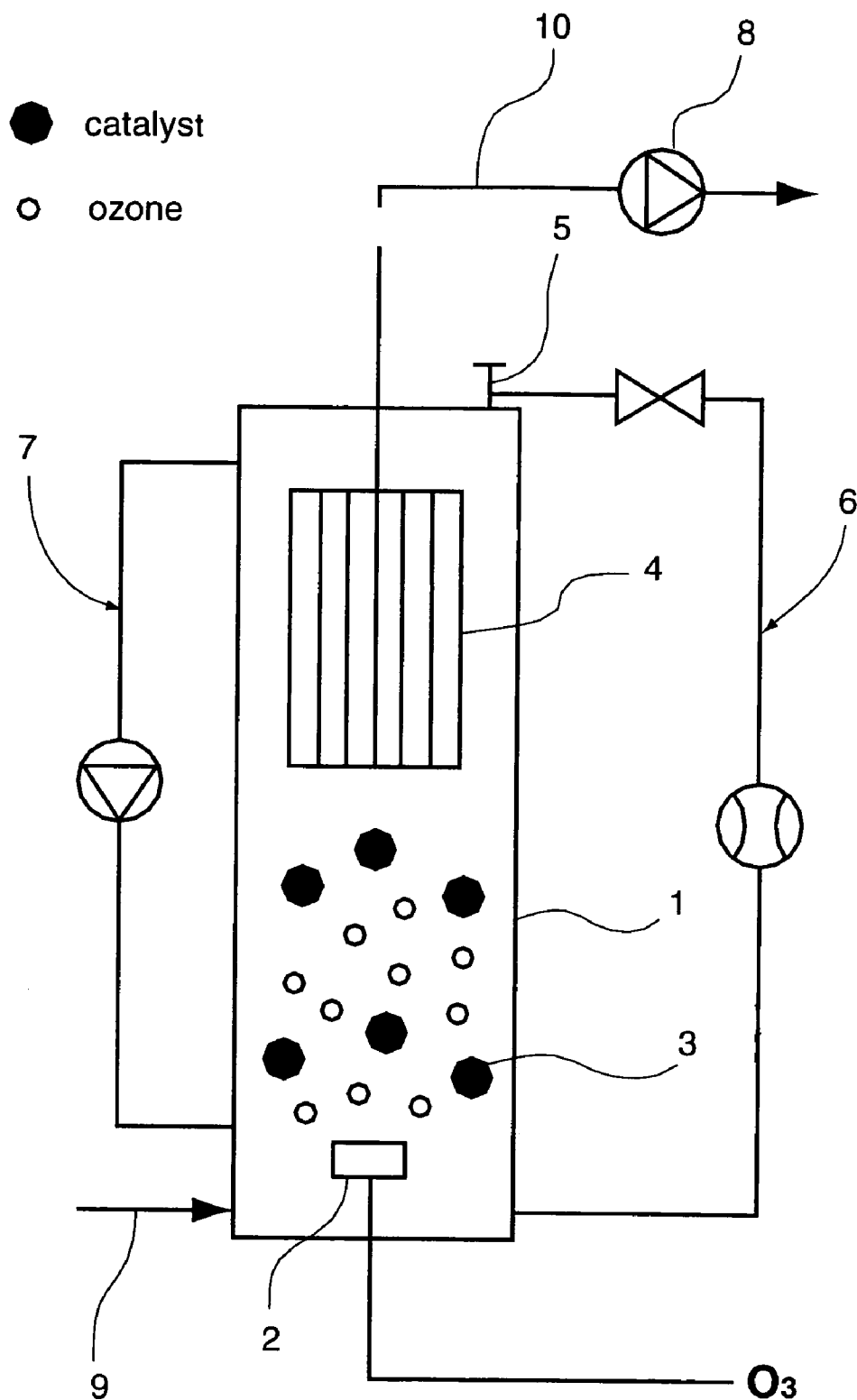

INSTALLATION AND METHOD FOR THE PURIFICATION OF AN AQUEOUS EFFLUENT BY MEANS OF OXIDATION AND MEMBRANE FILTRATION

This application is a U.S. National Stage application of PCT Application No. PCT/FR04/02653, with an international filing date of Oct. 15, 2004. Applicant claims priority based on French application serial no. 03 12765 filed Oct. 30, 2003.

The subject of the invention is the purification of aqueous effluents and it is particularly but not exclusively applicable to:

- treatment of industrial or domestic waste water;
- treatment of tip leached products (percolates);
- treatment of surface water to make it drinkable;
- depollution treatment of ground water;
- treatment of membrane filtration concentrates.

The main purpose of treatments for the purification of aqueous effluents is to eliminate organic material contained in these effluents and that is not easily biodegradable. Several methods may be used to achieve this objective.

It is thus known that effluents can be filtered on an adsorbent material such as activated carbon that is capable of retaining the organic material contained in them. Such a technique has the major disadvantage that it requires large quantities of adsorbent material for a given quantity of organic material to be eliminated, and therefore can be very expensive. Regeneration of the adsorbent material itself is expensive.

Other processes use membrane filtration such as a microfiltration, ultrafiltration, nanofiltration or inverse osmosis membrane. Apart from the fact that they are also relatively expensive, such processes also have the disadvantage that they concentrate rather than destroy the polluting organic material. Therefore, this recuperated organic material then has to be degraded, usually by incineration.

Even other processes for elimination of organic material use a step consisting of flocculating the organic material, by adding one or more coagulating compounds in the treated effluents. These coagulating compounds may be mineral compounds for example such as polyaluminium chloride, alumina sulphate or ferric chloride or organic compounds for example such as cationic polymers. Coagulated flocs formed from organic material can then be eliminated by settlement.

Such processes have the major disadvantage that they produce large quantities of sludge that is a by product difficult to be eliminated. It will be noted that according to one improved coagulation—flocculation—settlement process, the flocculation step may be combined with oxidation by the introduction of Fenton's reagent ($H_2O_2/Fe^{2+}$) into the effluent. Although the quantities of sludge produced during the use of such a process are much lower than in the case of a conventional flocculation process, they are nevertheless very large.

Finally, some aqueous effluent purification processes use a step in which the organic material is highly oxidised by a powerful oxidant (for example such as ozone, chlorine, chlorine dioxide) or a powerful oxidising system (for example such as ozone/UV, hydrogen peroxide ozone, hydrogen peroxide/UV). Oxidation facilitates degradation of organic molecules into smaller and more easily biodegradable molecules.

Ozone is the most attractive oxidant of the oxidising products conventionally used to oxidise organic material since, under some conditions of use, it is capable of completely destroying organic material by "mineralising" it into carbon dioxide and mineral salts. Furthermore, ozone enables radical reactions involving the OH free radical that provides a means of very strongly oxidising the organic material when it is applied to a basic pH or in combination with hydrogen peroxide or with ultraviolet radiation (the oxidoreduction potential of hydrogen peroxide is 1.6 volts, the corresponding values for ozone and the OH radical are 2.07 and 2.7 respectively).

Therefore processes using oxidation provide a means of destroying the polluting organic material contained in the aqueous effluents rather than simply concentrating it as is the case with filtration processes, or separating it from the aqueous phase as is the case with coagulation—flocculation—settlement processes.

However, such processes have the economic disadvantage that they require relatively large quantities of oxidising products to treat a given quantity of effluents.

The purpose of the invention is to provide a method for the purification of aqueous effluents including an optimised oxidation step, in other words a step in which the quantity of oxidising product necessary to treat a given volume of effluents will be less then in conventional oxidation techniques.

Such a process could be used to purify water containing large quantities of organic material, for example such as some industrial effluents or tip leached products, in other words water that has flowed through stored waste. These effluents are typically characterised by a very large content of organic material that is not easily biodegradable. Conventionally, these tip leached products have a $BOD_5/COD$ ratio often less than 0.1 leading to a very low biodegradability ($BOD_5$ represents the "Biological Oxygen Demand" of the effluent and defines the total quantity of organic material present in it). Therefore, it is difficult to purify such effluents because the only way of eliminating the organic materials from them is to use expensive treatment processes. In particular, in the past it has been impossible to consider purifying tip leached products using techniques involving powerful oxidants with reasonable treatment costs.

Another purpose of the invention is to provide a purification installation using small quantities of product compared with existing techniques according to the state of the art.

These and other purposes that will appear later are achieved using a purification installation for an aqueous effluent containing organic material of the type including at least one reaction vessel with at least one inlet of the said effluent, at least one outlet of the said effluent and at least one vent and injection means for at least one oxidizing gas, the said reaction vessel containing a bed of a material capable of catalyzing the oxidation reaction of the said organic material of the said effluent and/or adsorbing this organic material. According to the invention, the said reaction vessel also includes an immersed membrane filtration device and the said reaction vessel defines a single chamber including oxidation and filtration treatments of the said effluent, the said chamber being designed such that the said effluent and the said oxidizing gas are injected in counter-current towards the said bed of catalyst material and then towards the said membrane filtration device.

Therefore, the invention clearly proposes a solution to combine several treatments inside a single compartment.

It will be understood that such integration offers a large number of advantages, including:

- reduction of operating costs related to filtration of the catalyst and/or adsorbent material, and putting it into suspension;
- economic saving due to elimination of structures and accessories;
- space saving induced by manufacturing of a more compact reaction vessel;

simplification of the hydraulic system, and the use of less equipment.

The result of this integration according to the invention is a genuinely synergetic effluent treatment combination.

The oxidising gas performs several functions in the installation according to the invention due to combining of treatment means like those defined above, in a single chamber.

Firstly, the oxidising gas obviously performs a degradation function of organic materials dissolved in the effluent to be treated.

The oxidising gas performs a second function which is to hold the said material in suspension in the reaction vessel, which optimises the action of the reaction vessel.

The oxidising gas performs another function which is to limit clogging of membranes of the filtration device due to the mechanical action of the gas on the membranes that in particular improves the effluent flow.

Note that combining of the means of injection of an oxidising gas such as ozone and a membrane filtration device in the same reaction vessel according to the invention is a method that is contradictory to conventional practices that consist of using two separate tanks to separate the oxidation treatment and the membrane device, ozone (usually used as an oxidising gas) being considered by those skilled in the art as being a membrane degradation source.

Surprisingly, the Applicant has observed that integration of oxidising and membrane filtration treatments in the same reaction vessel does not cause any degradation of membranes by ozone after oxidation of the refractory organic materials of the effluent. On the contrary, ozone contributes to limiting clogging of membranes, combining the mechanical action of gas bubbles and possibly the oxidising action on the clogging organic material present on the surface of the membrane, thus increasing the membrane cycle durations.

Therefore under optimum operating conditions, this action of ozone or more generally of the oxidising gas on the membranes is much more efficient than if a simple aeration of the membranes is done by injection of air or oxygen injected at the membranes.

Therefore, the invention is particularly effective and economic compared with the traditional method that would have led those skilled in the art to use two tanks: one for oxidation by ozone possibly in the presence of a catalyst, the effluent, the other tank for membrane filtration of the oxidised effluent, this second tank being provided with an aeration system specific to the membranes. Furthermore, this type of installation would result in the catalyst without ozone, if any, to saturate in the second tank, which could obviously mean that this catalyst might no longer be able to perform its role in the first tank when it is reinjected into it.

Furthermore, the installation according to the invention provides a means of regenerating the catalyst and/or adsorbent material directly in the reaction vessel, this regeneration advantageously taking place continuously.

According to one advantageous solution, the said material consists of a solid mineral material with a capacity for adsorption of organic materials, preferably doped in metallic substances.

The result is a particularly efficient and active bed of material since it optimises the oxidation action of the oxidising gas and retains a large fraction of the organic materials in the effluent within it.

Advantageously, the said material is present in the said reaction vessel in the form of a fluidised bed. In this case, the size grading of the said catalyst is preferably less than 100 µm and preferably between about 10 nm and about 40 µm.

According to one preferred solution, the said material comprises at least one material belonging to the following group:
alumina;
titanium;
coal;
activated carbon;
polymetallic oxides.

According to a first variant embodiment, the membranes are micro-filtration membranes.

According to a second variant embodiment, the membranes are ultra-filtration membranes.

According to a third variant embodiment, the membranes are nano-filtration membranes.

One of these variant embodiments will be adopted depending on the required objective, for example this objective could be to obtain a simple separation of the material and the treated effluent, with treatment of undesirable substances.

Furthermore, according to one first embodiment, the membranes are of the mineral type.

According to a second embodiment, the membranes are of the organic type.

Advantageously, the said material forms a pre-layer on the surface of the said membrane filtration device.

The cake thus formed by the material on the surface of the membrane tends to significantly improve filtration and treatment performances of the corresponding membrane.

Preferably, the said oxidising gas comprises at least one of the oxidants belonging to the following group:
air;
ozone;
ozoned air;
nitrogen oxides;
oxygen.

Ozone in particular could be chosen as a powerful oxidant that can give rise to strongly oxidising free radicals and allow decomposition of the organic material, either by transforming it into biodegradable materials or by mineralising it into carbon dioxide and mineral salts. Other oxidants like that mentioned above could be considered by those skilled in the art.

According to one advantageous solution, the installation includes means of adding $H_2O_2$ into the said reaction vessel.

This addition of $H_2O_2$ can be made continuously or sequentially, its oxidising power possibly combining with that of ozone.

According to another characteristic, the installation comprises a recirculation loop of the said effluent in the said reaction vessel.

In this way, a contact time can be maintained between the effluent and the reagents within the reaction vessel while enabling a fairly high effluent flow.

In this way, the effluent treatment time within the reaction vessel can be increased if necessary.

Preferably, the said reaction vessel is made in the form of a column with no mechanical stirring.

The invention also relates to a process implemented using the installation that has just been described and characterised in that the said oxidising gas is added continuously into the said reaction vessel.

According to one preferred solution, the contact time between the said effluent and the said material is between about 5 minutes and about 3 hours, this duration preferably being between about 30 minutes and about 60 minutes.

Advantageously, the process comprises a step to re-circulate gas from the reaction vessel vent.

Preferably, the filtration step is performed by suction in external-internal configuration.

This step is advantageously done with a suction pressure of less than about 1 bar and preferably a suction pressure between 0.1 bars and about 0.8 bars.

Other characteristics and advantages of the invention will become clearer after reading the following description of a preferred embodiment of the installation according to the invention given as an illustrative and non-limitative example, with reference to the single FIG. 1 that is a diagrammatic view of an installation according to the invention.

As illustrated in FIG. 1, the installation comprises a reaction vessel 1 with an inlet pipe 9 for the effluent to be treated, an outlet pipe 10 for the treated effluent, a vent 5 in its upper part to be used for evacuation of gases and means 6 for recirculation of this gas at the bottom of the reaction vessel.

The installation also comprises means 2 for continuous injection of ozone into the reaction vessel that also contains a material 3 in the form of a fluidised bed.

A membrane filtration device 4 is also integrated into the reaction vessel 1.

Therefore in this way, the reaction vessel 1 defines a single chamber that includes effluent oxidation and filtration treatments, this single chamber being designed according to the invention such that the effluent and the oxidizing gas (in fact ozone) is injected in counter-current towards the bed of catalyst material 3 and then the filtration membranes 4.

Note that this reaction vessel is made in the form of a column with no mechanical stirring, effluent and the oxidising gas being injected at the bottom of the column.

For example, the means 2 of injecting the oxidising gas consist of an emulsifier (also called a vacuum jar or hydroinjector). It is also possible to use "Venturi" type emulsion equipment or any other apparatus for the formation of oxidising gas micro-bubbles in the liquid to be treated.

The material used to improve the reactivity of ozone is a mineral solid powder material present in the reaction vessel in a proportion between 0.5 g/l and 50 g/l.

In this embodiment, this catalyst material is boehmite alumina ($\gamma Al_2O_3$) calcined at a temperature of less than 600° C. Note that boehmite alumina can be used pure or in a form enriched in metallic substances (particularly in order to increase its capacity for adsorption of organic materials).

Furthermore, the catalyst material is finely divided such that the diameter of its particles is less than 50 μm (preferably, the diameter of the particles is about 30 μm), therefore the catalyst has a very high exchange surface area enabling adsorption of most organic materials in the effluent.

Furthermore, the catalyst particles contained in the effluent are separated by using the membrane filtration device 4, made using membranes in which the pore dimensions are preferably less than 0.1 μm. These membranes are preferably made from ceramic or an organic polymer resistant to ozone.

Note that the membranes used may be micro-filtration membranes, ultra-filtration or nano-filtration membranes, depending particularly on the dimension of the catalyst particles.

Note also that the transition between the fluidised bed of the catalyst material 3 and the membranes 4 is such that the catalyst forms a pre-layer on the surface of membranes 4.

According to this embodiment, the effluent is filtered by suction in an external-internal configuration, using a pump 8 installed on the evacuation pipe 10; the said pump is used to obtain a suction pressure of about 0.8 bars.

Furthermore, a re-circulation loop 7 of the effluent is provided, by which the effluent is continuously (or semi-continuously according to another possible embodiment) recirculated in the reaction vessel. There is also a recirculation loop 6 for gases output from the vent 5.

Other embodiments or improvements are obviously possible, particularly by providing means of adding $H_2O_2$ as the only oxidant or combined with ozone in the reaction vessel.

We will now describe two tests carried out with the installation according to the invention.

The effluent to be treated in these tests was dirty water produced by the cosmetic industry after having been subjected to a biological pre-treatment.

Test in Batch Mode

A first series of tests is carried out in batch mode. Five liters of effluent are added into the reaction vessel. The effluent is oxidised in this reaction vessel into which ozone is injected continuously, the treated water being separated from the catalyst ($\gamma Al_2O_3$) using immersed micro-filtration membranes, the permeate being recirculated continuously in the reaction vessel.

In a first test, it is planned to treat an effluent with a COD (Chemical Oxygen Demand) of 213 mg/l and a TOC (Total Organic Carbon) of 75.8 mg/l, with a recirculated permeate flow of 10 l/h and an exposure time of 60 min. The treatment performed is ozone alone (without catalyst), the ozone being injected at a rate of 4.6 g of $O_3$/g of COD.

The results of this first test are as follows:
final COD: 74.8 mg/l, namely a reduction of 64.9%
final TOC: 34.1 mg/l, namely a reduction of 55%
quantity of $O_3$ consumed/TOC eliminated: 8.4.

In a second test, it is planned to treat an effluent with a COD (Chemical Oxygen Demand) of 181 mg/l and a TOC (Total Organic Carbon) of 61.4 mg/l, with a recirculated permeate flow of 10 l/h and an exposure time of 60 min. The treatment performed is a treatment with ozone in the presence of 20 g of catalyst per liter, the ozone being injected at a rate of 4.7 g of $O_3$/g of COD;

The results of this second test are as follows:
final COD: 47.7 mg/l, namely a reduction of 73.6%
final TOC: 19.9 mg/l, namely a reduction of 67.6%
quantity $O_3$ consumed/TOC eliminated: 6.3.

These first tests clearly indicate that the catalyzed oxidation followed by a membrane filtration in an installation according to the invention gives a better reduction both for COD and for TOC, compared with a treatment with ozone alone, and the ozone consumption is lower.

Tests in Continuous Mode

A second series of tests is carried out continuously. An effluent to be treated is injected into the reaction vessel at a flow rate of 10 l/h. The effluent is oxidised in this reaction vessel in which ozone is injected continuously, treated water being separated from the catalyst ($\gamma Al_2O_3$—) using immersed micro-filtration membranes, the permeate not being recirculated in the reaction vessel, unlike in semi-continuous mode.

In a first test, it is planned to treat an effluent with a COD (Chemical Oxygen Demand) of 185 mg/l with a flow of 10 l/h and an exposure time of 2 h. The treatment performed is a treatment with ozone alone (with no catalyst), the ozone being injected with a content of 3.8 g of $O_3$/g of COD.

The results of this test are as follows:
final COD: 104 mg/l, namely a reduction of 43.8%
final TOC: 45.5 mg/l, namely a reduction of 35.7%
quantity $O_3$ consumed/TOC eliminated: 11.1.

In a second test, it is planned to treat an effluent with a COD (Chemical Oxygen Demand) of 200 mg/l and a TOC (Total Organic Carbon) of 69.2 mg/l, with an exposure time of 48 h. The treatment performed is a treatment with ozone alone in the presence of 20 g of catalyst per liter, the ozone being injected at a rate of 4.2 g of $O_3$/g of COD;

The results of this second test are as follows:
final COD: 100 mg/l, namely a reduction of 50% final TOC: 40 mg/l, namely a reduction of 42.2% quantity $O_3$ consumed/TOC eliminated: 9.9.

In a third test, it is planned to treat an effluent with a COD (Chemical Oxygen Demand) of 200 mg/l, with an exposure time of 5 h. The treatment performed is an ozone treatment in the presence of 20 g of catalyst per liter, with added $H_2O_2$, the ozone being injected at a rate of 5.9 g of $O_3$/g of COD;

The results of this third test are as follows:

final COD: 72 mg/l, namely a reduction of 64% final TOC: 24.4 mg/l, namely a reduction of 64.7% quantity $O_3$ consumed/TOC eliminated: 9.1.

These tests show that the process and the installation according to the invention can give very good results compared with other treatments.

The invention claimed is:

1. A method of treating an aqueous influent containing organic matter, the method comprising:
   a. injecting an oxidizing gas into a bottom portion of a vertical oriented column reactor;
   b. suspending a bed of catalyst material in the column reactor to form a fluidized bed of catalyst material in the reactor wherein at least a portion of the fluidized bed is disposed in the lower portion of the column reactor;
   c. wherein the oxidizing gas injected into the column reactor functions to suspend the bed of catalyst material in the reactor;
   d. injecting the influent to be treated into the bottom portion of the column reactor where the influent is contacted with the oxidizing gas in the presence of the fluidized bed of catalyst material that promotes the oxidation reaction of organic material in the influent or promotes the adsorption of organic material by the bed of catalyst material thereby yielding treated water;
   e. wherein the column reactor includes an immersed membrane filtration unit disposed in the upper portion of the column reactor and where in at least a portion of the fluidized bed of catalyst material is maintained below the membrane filtration unit in the column reactor;
   f. after directing the influent through the fluidized bed of catalyst material and oxidizing gas in the lower portion of the column reactor, filtering at least a first portion of the treated water in the immersed membrane filtration unit disposed in the upper portion of the column reactor forming a filtered influent;
   g. directing the filtered influent from the reactor;
   h. bypassing the immersed membrane filtration unit with at least a second portion of the treated water such that the second portion of the treated water is non-permeated treated water;
   i. recirculating at least a portion of the non-permeated treated water from the upper portion of the column reactor, through a recirculation line that lies outside of the column reactor and back into the lower portion of the column reactor; and
   j. recirculating at least a portion of the oxidizing gas from the upper portion of the column reactor, through a gas recirculation loop disposed outside of the column reactor and back into the lower portion of the column reactor.

2. The method of claim 1 including forming at least some of the catalyst material on the surfaces of the membrane filtration unit, and directing at least some of the influent through the catalyst material formed on the surface of the membrane filtration unit.

3. The method of claim 1 wherein the membrane filtration unit includes a series of membranes and the method includes utilizing the oxidizing the gas to:
   i. promote the oxidation reaction of organic material in the influent;
   ii. suspend the catalyst material in the column reactor to form the fluidized bed; and
   iii. limit clogging of the membranes of the membrane filtration unit due to the mechanical action of the oxidizing gas on the membranes which in turn improves the flow of treated water through the membranes.

4. The method of claim 3 wherein oxidation of the influent and filtration by the membrane filtration unit both occur in a single chamber formed by the column reactor.

5. The method of claim 4 wherein the catalyst material is boehmite alumina.

6. The method of claim 1 wherein the fluidized bed of catalyst material comprises a solid mineral material having the capacity for adsorbing organic materials, and wherein the method includes directing the influent in the reactor through the solid mineral material and utilizing the solid mineral material to adsorb organic materials from the influent.

7. The method of claim 6 wherein the solid mineral material is doped with metallic substances.

8. The method of claim 1 including selecting the size of particles forming the catalyst material such that the size of the individual particles is of a grading less than 100μm.

9. The method of claim 8 wherein the particle size of the catalyst material has a size grading between about 10 nm and about 40 μm.

10. The method of claim 1 wherein the catalyst material is selected from the group comprising alumina, titanium, coal, activated carbon, polymetallic oxides, and derivatives thereof.

11. The method of claim 1 wherein directing the treated water through the membrane filtration unit comprises directing the treated water through one or more microfiltration membranes.

12. The method of claim 1 wherein directing the treated water through the membrane filtration unit comprises directing the treated water through one or more ultrafiltration membranes.

13. The method of claim 1 wherein directing the treated water through the membrane filtration unit comprises directing the treated water through one or more nanofiltration membranes.

14. The method of claim 1 wherein directing the treated water through the membrane filtration unit includes directing the treated water through a mineral filtration unit.

15. The method of claim 1 wherein directing the treated water through the membrane filtration unit includes directing the treated water through an organic filtration unit.

16. The method of claim 1 wherein the oxidizing gas comprises at least one oxidant taken from the group including air, ozone, ozoned air, nitrogen oxide, oxygen, and derivatives thereof.

17. The method of claim 1 including adding $H_2O_2$ into the reactor.

18. The method of claim 1 wherein the influent is not subjected to mechanical stirring within the reactor.

19. The method of claim 1 including contacting the influent with the catalyst material for a period of about 5 minutes to about 3 hours.

20. The method of claim 19 including contacting the influent with the catalyst material for a period of about 30 minutes to about 60 minutes.

21. The method of claim 1 including providing a suction source disposed external to the reactor and operatively connecting the suction source to the membrane filtration unit for inducing filtered effluent from the filtration membrane unit and from the reactor.

22. The method of claim 21 wherein the suction includes a pressure of less than 1 bar.

23. The method of claim 21 wherein the suction includes a pressure is between 0.1 bars and 0.8 bars.

24. A system for oxidizing and filtering an aqueous influent containing organic matter, the system in operation comprising:
   a. a single chamber column reactor oriented in a vertical configuration and having a bottom portion and an upper portion;
   b. an influent inlet formed in the bottom portion of the column reactor for permitting the influent to enter the bottom portion of the column reactor;
   c. a fluid bed of catalyst material disposed in the column reactor and wherein a substantial portion of the fluid bed of catalyst material is disposed in the lower portion of the column reactor;
   d. an oxidizing gas inlet formed in the bottom portion of the column reactor for injecting an oxidizing gas into the bottom portion of the column reactor and for oxidizing the organic material in the influent and for suspending the catalyst material in the column reactor and forming the fluidized bed of catalyst material;
   e. a membrane filtration unit for filtering the treated influent and producing a filtered influent, the membrane filtration unit being disposed in the upper portion of a column reactor over a substantial portion of the fluidized bed such that the influent injected into the bottom of the column reactor moves upward through the fluidized bed and is treated therein prior to reaching the membrane filtration unit;
   f. a recirculation line extending exteriorly of the reactor for directing a non-permeated treated water stream from the upper portion of the column reactor into a bottom portion of a column reactor such that the recirculation line is operative to transfer non-permeated treated water from the upper portion of the column reactor, through the exterior recirculation line and into the bottom portion of the column reactor; and
   g. an oxidizing gas recirculation line extending exteriorly of a column reactor for transferring oxidizing gas from the upper portion of the column reactor, through the exterior recirculation line and into the bottom portion of the column reactor.

25. The system of claim 24 wherein the catalyst material comprises a solid mineral material having the capacity for adsorbing organic materials.

26. The system of claim 25 wherein the bed of catalyst material includes particles and wherein the size of the particles is of a grading less than 100 μm.

27. The system of claim 24 wherein the catalyst material has a concentration of approximately 0.5 g/l and 50 g/l in the reactor.

28. The system of claim 24 wherein the catalyst material is boehmite alumina which has been calcined at a temperature of less than 600° C.

29. The system of claim 28 wherein the boehmite alumnia is enriched in metallic substances.

30. The system of claim 24 wherein the catalyst material has a diameter of less than approximately 50 μm.

31. The system of claim 30 wherein the catalyst material has a diameter of approximately 30 μm.

32. The system of claim 24 wherein the membrane filtration unit includes a plurality of membranes and wherein the type of membranes disposed therein is based on a dimension of the catalyst material.

* * * * *